UNITED STATES PATENT OFFICE.

EDWARD THORNDIKE LADD AND EBEN CHILDS SPEIDEN, OF NIAGARA FALLS, NEW YORK, ASSIGNORS TO ISCO CHEMICAL COMPANY, INC., OF NIAGARA FALLS, NEW YORK, A CORPORATION OF NEW YORK.

BLEACHING POWDER AND PROCESS OF PRODUCING THE SAME.

1,409,955. Specification of Letters Patent. Patented Mar. 21, 1922.

No Drawing. Application filed March 5, 1921. Serial No. 449,901.

*To all whom it may concern:*

Be it known that we, EDWARD THORNDIKE LADD and EBEN CHILDS SPEIDEN, both citizens of the United States, residing at Niagara Falls, in the county of Niagara and State of New York, have invented certain new and useful Improvements in Bleaching Powders and Processes of Producing the Same; and we do hereby declare the following to be a full, clear and exact description of the invention, such as will enable others skilled in the art to which it appertains to make and use the same.

This invention relates to the bleaching powder well known in commerce as "chloride of lime," and has for its object to provide a process for producing the same which will be simple and inexpensive to carry out, and a product which will be more efficient in use than those heretofore proposed.

With these and other objects in view the invention consists in the novel steps and combinations of steps constituting the process and in the novel product or products resulting from said process, all as will be more fully hereinafter disclosed and particularly pointed out in the claims.

In order that the precise invention may be the more clearly understood, it is said: It is well known that in preparing the ordinary bleaching powder, it is customary to hydrate quick lime containing calcium oxide, CaO, thus producing what is commercially known as a "lime hydrate," which may contain magnesium hydrate and other impurities carried by the lime. This said lime hydrate is next screened to separate therefrom the pieces of so called "lime stone" or so called "core" of the lime lumps, as well as to separate out such other foreign or undesirable impurities as may be susceptible of being separated out by screening. The so called "lime hydrate" thus separated will be found to contain relatively coarse and fine particles, and the mass is next treated with chlorine in bleach chambers in the manner well known, so the "chloride of lime" or bleaching powder of commerce results.

According to this invention, on the other hand, we have observed that the lime hydrate together with such impurities as have not been separated out by the above mentioned process of screening may be divided into a portion containing the relatively coarse and into a portion containing the relatively fine particles. We have also observed that if one separates out from the lime hydrate material a portion containing substantially all, or a large percentage of the fine particles of hydrate and impurities present, leaving behind in a second portion a large percentage of, or substantially all, the coarse particles, and then treats said second portion of hydrate material with chlorine gas in the manner well known, a very different and useful product will result from that heretofore obtained. That is to say, the product of said treatment will be found to be a heavier and more massive bleach than would be the case if said finer particles had not been removed.

In other words, it is probable the larger percentage of coarser particles now remaining in said second portion of the lime hydrate mass before chlorination, changes the character or size of the pores, or interstices, existing between the particles of the hydrated lime and therefore permits a more thorough penetration of the mass by the chlorine than is possible in the prior processes, with the result that a better or more efficient chlorination results, and thus produces a corresponding change in the properties of the finished product.

In the same way, we have further discovered that after removing all, or a substantial percentage of the coarse particles to form said other portion of hydrate containing all or a substantial percentage of the finer particles present one treats this said other portion with chlorine gas, a bleach powder will be obtained which is lighter and more fluffy than is the case when said coarser particles are left in the chlorinated mass. This change in the physical character of the last mentioned product is also probably due to the change in porosity of the mass brought about by the fineness of the particles left therein, which must to a large extent govern the penetration of the said mass by the chlorine gas.

Each product thus produced is very different from the other, and also very different from a chloride of lime made by the ordinary processes without this new step which we have introduced. Further, each of these new products has its own special advantages for those uses to which it is especially adapted.

By the term lime hydrate found in the description and claims we mean the product obtained by hydrating commercial lime, which usually chiefly consists of calcium hydrate $Ca(OH)_2$ but often contains very substantial amounts of other substances among which may be mentioned magnesium hydrate.

It is obvious that those skilled in the art may vary the details of procedure as well as the products resulting from said procedures without departing from the spirit of the invention, and therefore we do not desire to be limited to the above disclosure, except as may be required by the claims.

What we claim is:

1. The process of making a bleaching powder which consists in producing a lime hydrate containing particles in a relatively coarse and finely divided state; separating out of the mass a substantial portion of one of said sets of particles; and chlorinating the mass containing the particles not removed, substantially as described.

2. The herein described new bleaching powder consisting of screened chlorinated lime hydrate whose particles have been further segregated in a more uniform size than those of normal bleaching powders, substantially as described.

3. The herein described new bleaching powder consisting of a screened and chlorinated lime hydrate from which, before chlorination, a substantial proportion of its larger sized naturally occurring particles had been further removed said powder being heavier and more massive than normal bleaching powders, substantially as described.

In testimony whereof we affix our signatures.

EDWARD THORNDIKE LADD.
EBEN CHILDS SPEIDEN.